US011503587B2

(12) United States Patent
Khoshnevisan et al.

(10) Patent No.: US 11,503,587 B2
(45) Date of Patent: Nov. 15, 2022

(54) SEMI-PERSISTENT SCHEDULING WITH MULTIPLE TRANSMIT-RECEIVE POINTS

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Makesh Pravin John Wilson, San Diego, CA (US); Arumugam Chendamarai Kannan, San Diego, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/686,680

(22) Filed: Nov. 18, 2019

(65) Prior Publication Data

US 2020/0205141 A1 Jun. 25, 2020

Related U.S. Application Data

(60) Provisional application No. 62/782,883, filed on Dec. 20, 2018.

(51) Int. Cl.
*H04W 72/04* (2009.01)

(52) U.S. Cl.
CPC ....... *H04W 72/044* (2013.01); *H04W 72/042* (2013.01)

(58) Field of Classification Search
CPC ............. H04W 72/044; H04W 72/042; H04W 88/085; H04L 5/0094; H04L 5/0055; H04L 5/0044
See application file for complete search history.

(56) References Cited

U.S. PATENT DOCUMENTS

2011/0222501 A1* 9/2011 Kim .................. H04W 74/0833
370/328
2015/0195072 A1* 7/2015 Seo ....................... H04L 1/1854
370/329
(Continued)

FOREIGN PATENT DOCUMENTS

WO 2018030766 A1 2/2018

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP Draft; 36300-F30, 3rd Generation Partnership Project (3GPP), Mobile Competence Centre, 650, Route Des Lucioles, F-06921, Sophia-Antipolis Cedex, France, Oct. 2, 2018 (Oct. 2, 2018), XP051519422, 358 pages, Retrieved from the Internet: URL: http://www.3gpp.org/ftp/tsg%5Fran/WG2%/5FRL2/Specifications/200803%5Ffinal%5Fspecs%5Fafter%5FRAN%5F39/36300%2Df30%2Ezip [retrieved on Oct. 2, 2018] Sections 11.1.1, 11.1.2 and 23.14.1.1.
(Continued)

*Primary Examiner* — John D Blanton
(74) *Attorney, Agent, or Firm* — Arent Fox LLP

(57) ABSTRACT

A user equipment (UE) may be provisioned with multiple semi-persistent scheduling (SPS) configurations. The UE may determine a differentiation characteristic for determining which SPS configuration is indicated by a downlink control information or associated with a physical downlink shared channel (PDSCH). For example, the UE may receive a first activation of a first SPS configuration and a second activation of a second SPS configuration. The UE may determine the differentiation characteristic between the first SPS configuration and the second SPS configuration. The UE may determine that one of the first SPS configuration or the second SPS configuration is the SPS configuration for a
(Continued)

received PDSCH based on the differentiation characteristic. The UE may transmit an acknowledgment of the PDSCH based on the determined SPS configuration.

20 Claims, 9 Drawing Sheets

(56) References Cited

U.S. PATENT DOCUMENTS

| | | | |
|---|---|---|---|
| 2018/0049229 A1 | 2/2018 | Dinan et al. | |
| 2019/0174327 A1 | 6/2019 | You et al. | |
| 2020/0305038 A1* | 9/2020 | Tooher | H04W 74/0833 |
| 2020/0351896 A1* | 11/2020 | Taherzadeh Boroujeni | H04L 5/0053 |
| 2020/0374911 A1* | 11/2020 | Lee | H04L 5/0042 |
| 2021/0159948 A1* | 5/2021 | Li | H04W 72/1289 |

OTHER PUBLICATIONS

Partial International Search Report—PCT/US2019/062206—ISA/EPO—Mar. 6, 2020.

Samsung Electronics R&D Institute UK: Considerations of the Number of SPS Configurations per cell Group and TP for TS 38.321v1.0.0, 3GPP Draft; R2-1710335 Considerations of the Number of SPS Configurations Per Cell Group and TP for TS 38.321V1. 0.0, 3rd Generation Partnership Project (3GPP), Mobile Competence Centre; 650, Route De, vol. RAN WG2, No. Prague, Czech Republic; Oct. 9, 2017-Oct. 13, 2017, Oct. 8, 2017 (Oct. 8, 2017), XP051342383, 3 Pages, Retrieved from the Internet: URL: http://www.3gpp.org/ftp/Meetings_3GPP_SYNC/RAN2/Docs [Retrieved on Oct. 8, 2017], Sections "Introduction" and "Number of SPS Configurations per cell group".

International Search Report and Written Opinion—PCT/US2019/062206—ISA/EPO —Apr. 20, 2020.

ZTE: "Enhancement for UL Grant-free Transmissions", 3GPP Draft, 3GPP TSG RAN WG1 Meeting #95, R1-18138847, E Enhancement for UL grant-free Transmissions, 3rd Generation Partnership Project (3GPP), Mobile Competence Centre, 650, Route Des Lucioles, F-06921, Sophia-Antipolis Cedex, France, vol. RAN WG1. No. Spokane. USA, Nov. 12, 2018-Nov. 16, 2018, Nov. 13, 2018 (Nov. 13, 2018), XP051480093, 9 pages, Retrieved from the Internet: URL: http://www.3gpp.org/ftp/tsg%5Fran/WG1%5FRL1/TSGR1%5F95/Docs/R1%2D1813884%2Ezip [retrieved on Nov. 13, 2018].

* cited by examiner

SEMI-PERSISTENT SCHEDULING WITH MULTIPLE TRANSMIT-RECEIVE POINTS

CLAIM OF PRIORITY UNDER 35 U.S.C. § 119

This application claims priority to U.S. Provisional Application No. 62/782,883 titled "SEMI-PERSISTENT SCHEDULING WITH MULTIPLE TRANSMIT-RECEIVE POINTS," filed Dec. 20, 2018, which is assigned to the assignee hereof, and incorporated herein by reference in its entirety.

BACKGROUND

Technical Field

The present disclosure relates generally to communication systems, and more particularly, to techniques for semi-persistent scheduling.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, 5G NR technology may allow multiple transmit-receive points (TRP) to communicate with a user equipment (UE). One or more of the TRPs may utilize a control channel to schedule communications with the UE on a data channel. In some cases, where each TRP schedules communications, there may be ambiguity as to which communication the UE has received.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided that facilitate reception of a physical downlink shared channel (PDSCH) according to one of multiple semi-persistent scheduling (SPS) configurations. The method may include receiving a first activation of a first SPS configuration. The method may include receiving a second activation of a second SPS configuration. The method may include determining a differentiation characteristic between the first SPS configuration and the second SPS configuration. The method may include determining that one of the first SPS configuration or the second SPS configuration is the SPS configuration for a received PDSCH based on the differentiation characteristic. The method may include transmitting an acknowledgment of the PDSCH based on the determined SPS configuration.

In an aspect, the disclosure provides an apparatus for wireless communication. The apparatus may include a memory and at least one processor coupled to the memory. The processor may be configured to receive a first activation of a first SPS configuration. The processor may be configured to receive a second activation of a second SPS configuration. The processor may be configured to determine a differentiation characteristic between the first SPS configuration and the second SPS configuration. The processor may be configured to determine that one of the first SPS configuration or the second SPS configuration is the SPS configuration for a received PDSCH based on the differentiation characteristic. The processor may be configured to transmit an acknowledgment of the PDSCH based on the determined SPS configuration.

In an aspect, the disclosure provides another apparatus for wireless communication, the apparatus may include means for receiving a first activation of a first SPS configuration and a second activation of a second SPS configuration. The apparatus may include means for determining a differentiation characteristic between the first SPS configuration and the second SPS configuration. The apparatus may include means for determining that one of the first SPS configuration or the second SPS configuration is the SPS configuration for a received physical downlink shared channel (PDSCH) based on the differentiation characteristic. The apparatus may include means for transmitting an acknowledgment of the PDSCH based on the determined SPS configuration.

In an aspect, the disclosure provides a non-transitory computer-readable medium storing computer executable code. The non-transitory computer-readable medium may include code to receive a first activation of a first semi-persistent scheduling (SPS) configuration. The non-transitory computer-readable medium may include code to receive a second activation of a second SPS configuration. The non-transitory computer-readable medium may include code to determine a differentiation characteristic between the first SPS configuration and the second SPS configuration. The non-transitory computer-readable medium may include code to determine that one of the first SPS configuration or the second SPS configuration is the SPS configuration for a received physical downlink shared channel (PDSCH) based on the differentiation characteristic. The non-transitory computer-readable medium may include code to transmit an acknowledgment of the PDSCH based on the determined SPS configuration.

In another aspect, the disclosure provides a method, a computer-readable medium, and an apparatus are provided that facilitate activation or release of one of multiple SPS configurations in response to downlink control information (DCI). The method may include receiving a first SPS configuration. The method may include receiving a second SPS configuration. The method may include determining a differentiation characteristic between the first SPS configuration and the second SPS configuration. The method may include determining, based on the differentiation characteristic, an SPS configuration for a DCI indicating activation or release of the SPS configuration. The method may include activating or releasing one of the first SPS configuration or the second SPS configuration based on the determined SPS configuration and the DCI.

In an aspect, the disclosure provides an apparatus for wireless communication. The apparatus may include a memory and at least one processor coupled to the memory. The processor may be configured to receive a first SPS configuration. The processor may be configured to receive a second SPS configuration. The processor may be configured to determine a differentiation characteristic between the first SPS configuration and the second SPS configuration. The processor may be configured to determine, based on the differentiation characteristic, an SPS configuration for a DCI indicating activation or release of the SPS configuration. The processor may be configured to activate or release one of the first SPS configuration or the second SPS configuration based on the determined SPS configuration and the DCI.

In another aspect, the disclosure provides another apparatus for wireless communication. The apparatus may include means for receiving a first SPS configuration and a second SPS configuration. The apparatus may include means for determining a differentiation characteristic between the first SPS configuration and the second SPS configuration. The apparatus may include means for determining, based on the differentiation characteristic, an SPS configuration for a DCI indicating activation or release of the SPS configuration. The apparatus may include means for activating or releasing one of the first SPS configuration or the second SPS configuration based on the determined SPS configuration and the DCI.

In another aspect, the disclosure provides a non-transitory computer-readable medium storing computer executable code. The non-transitory computer-readable medium may include code to receive a first SPS configuration. The non-transitory computer-readable medium may include code to receive a second SPS configuration. The non-transitory computer-readable medium may include code to determine a differentiation characteristic between the first SPS configuration and the second SPS configuration. The non-transitory computer-readable medium may include code to determine, based on the differentiation characteristic, an SPS configuration for a downlink control information (DCI) indicating activation or release of the SPS configuration. The non-transitory computer-readable medium may include code to activate or release one of the first SPS configuration or the second SPS configuration based on the determined SPS configuration and the DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
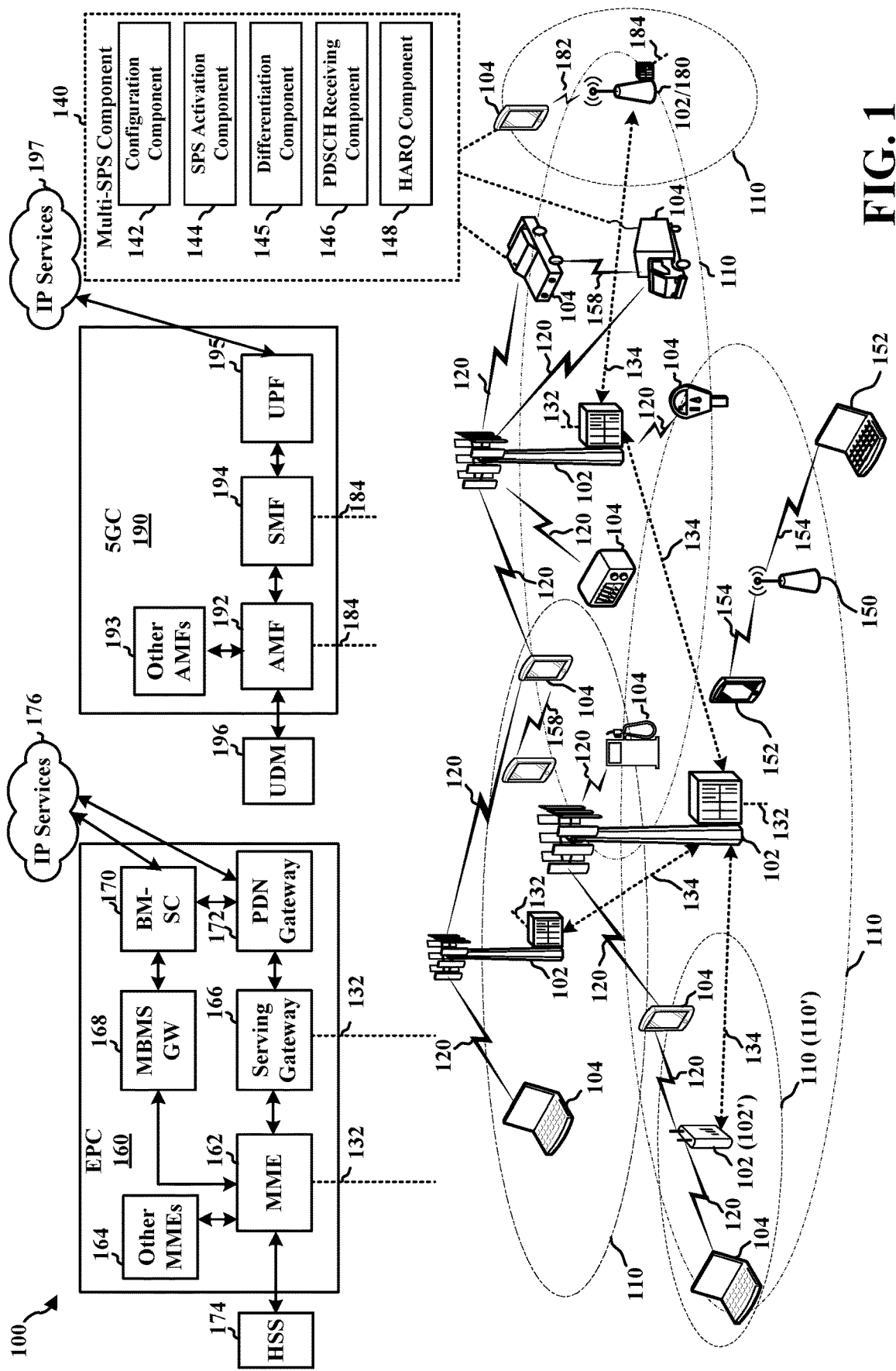
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Multi-TRP transmissions with regular scheduling may be classified into different modes. A first mode (mode 1) may utilize a single physical downlink control channel (PDCCH) to schedule physical downlink shared channel (PDSCH) transmissions from each of the multiple TRPs. The first mode may be utilized when an ideal backhaul is available to facilitate communications between the multiple TRPs. An ideal backhaul may be a connection between TRPs that meets certain latency requirements. For example, if the backhaul latency is less than a threshold (e.g., 1 or 2 ms), the backhaul may be considered an ideal backhaul. An ideal backhaul may be used for joint scheduling. The first mode may utilize one or more codewords to facilitate communications using different spatial layers. For example, if a single codeword is used, the single codeword may map to four layers with layers 1 and 2 transmitted from a first TRP while layers 3 and 4 may be transmitted from a second TRP. As another example, if two codewords are used, each codeword may be transmitted from a different TRP such that the first TRP transmits the first codeword mapped to layers 1 and 2, while the second TRP transmits the second codeword mapped to layers 3 and 4.

In a second mode (mode 2), which may be used with an ideal backhaul or a non-ideal backhaul, each TRP may transmit a PDCCH to schedule a PDSCH from the TRP. For example, a first PDCCH may schedule a first codeword transmitted from the first TRP and a second PDCCH may schedule a second codeword transmitted from the second TRP.

Downlink semi-persistent scheduling (SPS) may utilize a configuration (e.g., SPS configuration) and activation approach to schedule a UE to receive a PDSCH without a PDCCH for every transmission. An SPS configuration may be established, for example, via radio-resource control (RRC) signaling. The SPS configuration may include parameters such as a periodicity, a hybrid automatic repeat request (HARQ) resource on physical uplink control channel (PUCCH), a number of HARQ processes for SPS, etc. The HARQ resource may carry an acknowledgment (ACK) or negative acknowledgment (NACK) indicating whether the PDSCH was correctly received. The activation may be carried on a PDCCH downlink control information (DCI) scrambled with a configured scheduling radio network temporary identifier (CS-RNTI). For example, the DCI activating or releasing an SPS configuration may use DCI format 1_0 or DCI format 1_1. The DCI may include additional parameters of the SPS for the PDSCH. For example, the DCI may specify frequency domain resources, time domain resources, a modulation and coding scheme (MCS), a demodulation reference signal port (DMRS), a scrambling identifier for DMRS sequence generation; transmission configuration indicator (TCI) state, or quasi co-location (QCL) type.

When configured for multi-TRP communications, a UE may be configured with two or more SPS configurations. For example, in the second mode for TRP communications, each TRP may configure an SPS configuration using RRC to specify the configuration and the DCI to activate the configuration. After SPS activation, one or more of the TRPs may transmit a PDSCH according to a respective activated SPS configuration. A TRP may also not transmit on resources configured for an activated SPS (e.g., if no data is available to transmit). In an aspect, a single TRP may configure multiple SPS configurations, and the disclosed techniques may be applicable to the multiple SPS configuration of a single TRP.

In an aspect, a UE receiving a PDSCH based on an SPS configuration may need to determine which SPS configuration corresponds to the PDSCH. For example, the UE may use the SPS configuration for HARQ reporting. For example, the UE may determine which PUCCH resources to use to transmit an ACK/NACK. The UE may determine which HARQ-Ack codebook to use and how to format the ACK/NACK for the codebook based on the SPS configuration.

In another aspect, when the UE receives a DCI, the UE may need to determine which SPS configuration corresponds to the received DCI. The UE may activate or releasing the corresponding SPS configuration.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

In certain aspects, one or more of the UEs 104 may include a multi-SPS component 140 configured to receive a PDSCH from one or more TRPs according to one of at least two different SPS configurations. For example, the multi-SPS component 140 may configure the UE 104 to receive PDSCH from a base station 102 and a small cell 102' using the two different SPS configurations. The multi-SPS component 140 may include a configuration component 142 configured to receive SPS configuration information from each of the respective TRPs. The multi-SPS component 140 may include an SPS activation component 144 configured to receive a DCI indicating activation or release of an SPS configuration. The multi-SPS component 140 may include a differentiation component 145 configured to determine a differentiation characteristic between the first SPS configuration and the second SPS configuration. The SPS activation component 144 may determine the indicated SPS configuration based on the differentiation characteristic and activate or release the indicated SPS configuration with parameters included in the DCI. The multi-SPS component 140 may include a PDSCH receiving component 146 configured to receive a PDSCH according to the two or more SPS configurations. The PDSCH receiving component 146 may determine an SPS configuration corresponding to the received PDSCH based on the differentiation characteristic. The multi-SPS component 140 may include a HARQ component 148 configured to send an acknowledgment indicating whether the PDSCH was correctly received or not correctly received according to the determined SPS configuration.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
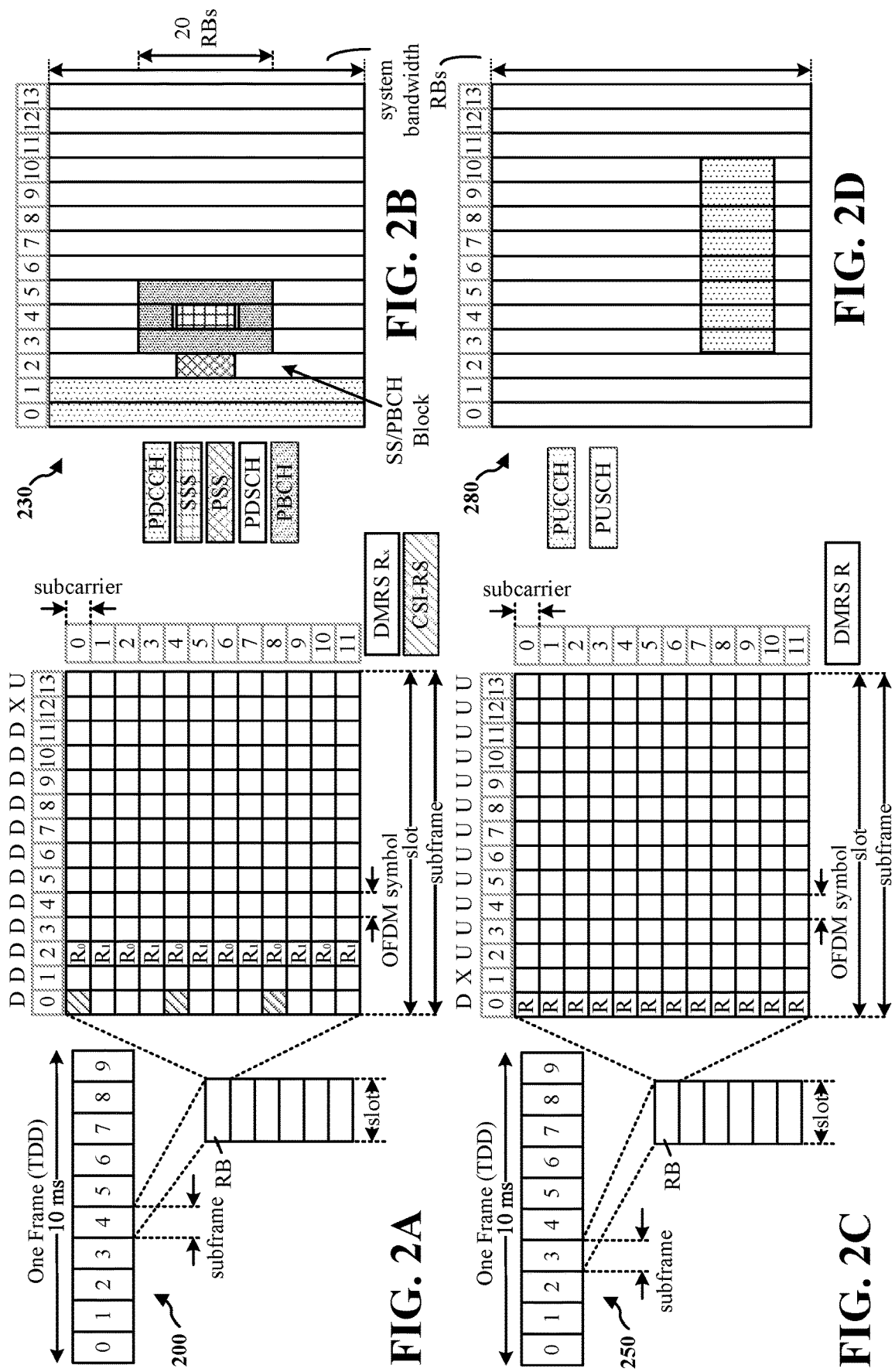
FIG. 2A is a diagram illustrating an example of a first 5G/NR frame.
FIG. 2B is a diagram illustrating an example of DL channels within a 5G/NR subframe.
FIG. 2C is a diagram illustrating an example of a second 5G/NR frame.
FIG. 2D is a diagram illustrating an example of a UL channels within a 5G/NR subframe.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback (HARQ-Ack). The PUSCH carries data, and may additionally be used to carry a buffer status report (BSR), a power headroom report (PHR), and/or UCI.

Figure 3:
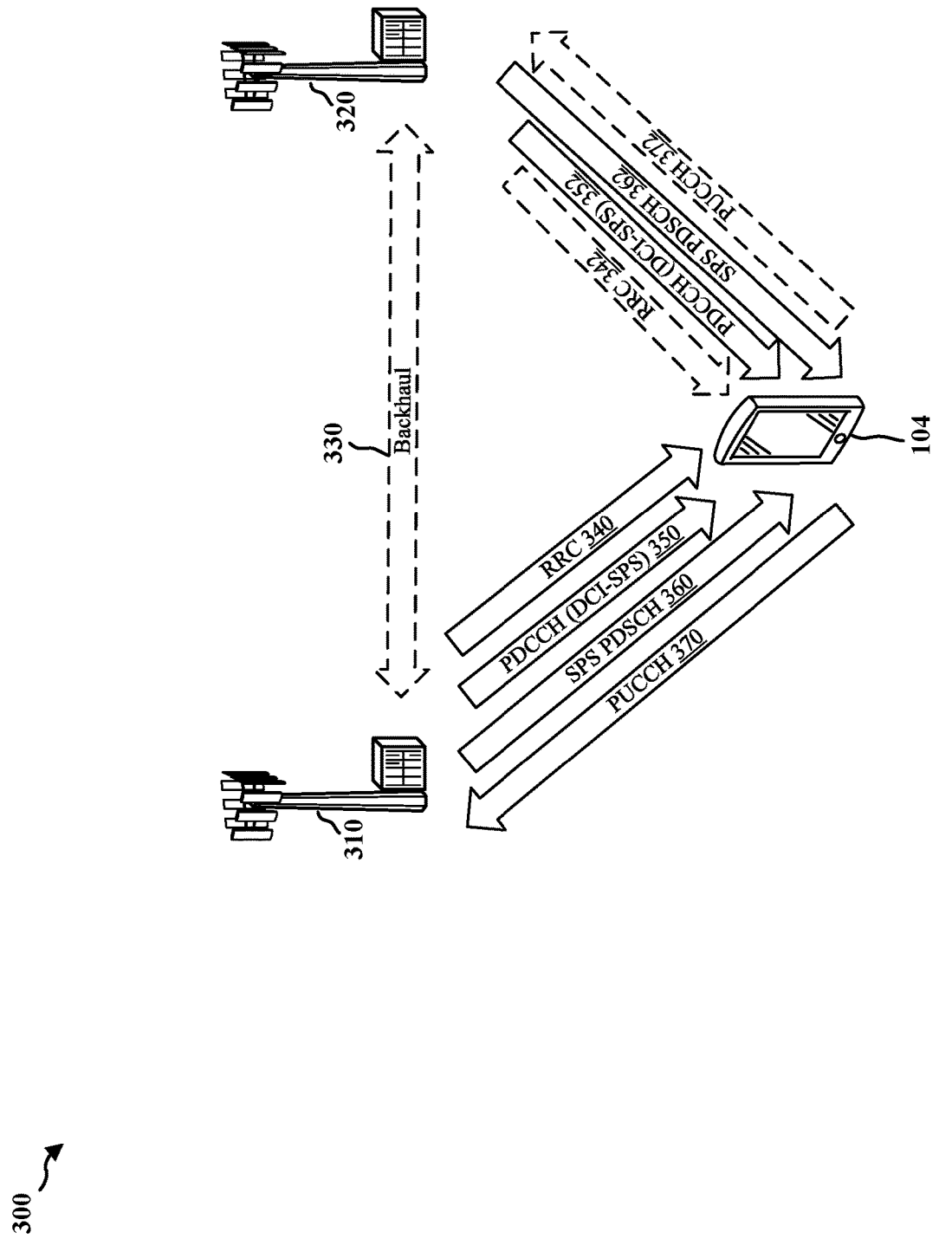
FIG. 3 is a diagram illustrating an example of multiple TRPs communicating with a UE.

FIG. 3 is a diagram showing communication channels between a UE 104, a first TRP 310, and a second TRP 320. The first TRP 310 and the second TRP 320 may be examples of a base station 102 shown in FIG. 1. The first TRP 310 and the second TRP 320 may optionally communicate via a backhaul 330, which may be an example of a backhaul link 134. The backhaul 330 may be a non-idea backhaul. For example, the backhaul 330 may not guarantee a speed or reliability of communications.

The first TRP 310 may transmit an RRC message 340 that establishes one or more SPS configurations. The RRC message 340 may establish a first SPS configuration for use by the first TRP 310. The RRC message 340 (or a second RRC message 340 from the first TRP 310) may also establish a second SPS configuration for use by the second TRP 320. Alternatively, the second TRP 320 may transmit an RRC message 342 that establishes the second SPS configuration for use by the second TRP 320. The RRC message 340 may specify SPS parameters in a cell configuration, PDSCH-Config information element and/or an SPS-Config information element. Example SPS parameters include a configured scheduling radio network temporary identifier (CS-RNTI), periodicity, number of HARQ processes, and HARQ-Ack resource. The CS-RNTI may indicate a RNTI used to scramble the cyclic redundancy check (CRC) of the DCI carrying an activation or release of the SPS configuration. The periodicity may indicate how often resources are granted for the SPS configuration. The number of HARQ processes may indicate the number of HARQ processes for the SPS configuration. The HARQ-Ack resource may indicate an uplink resource for PUCCH. The HARQ-Ack resource may be referred to as n1PUCCH-AN.

When the TRP 310 or TRP 320 determines to activate one of the SPS configurations, the TRP 310 or TRP 320 may transmit a PDCCH 350, 352. The PDCCH 350, 352 may utilize DCI format 1_0 or DCI format 1_1. An activation DCI may include additional SPS configuration parameters. For example, the DCI may include a time-domain resource allocation, a frequency-domain resource allocation (e.g., a bitmap according to type 0 or start and number of RBs according to type 1 allocation), a MCS, antenna ports, DMRS sequence initialization, and TCI state. The time-domain resource allocation may provide an index (which may be referred to as "m") into an allocation table that may be used to determine the start symbol and length of the PDSCH based on the periodicity. The frequency domain resource allocation may indicate how the PDSCH is mapped to resource blocks. Based on the periodicity, time-domain resource allocation, and frequency-domain resource allocation, the UE 104 may determine which resources are configured to carry the SPS PDSCH 360. The MCS, antenna ports, DMRS sequence initialization, and TCI state may all affect decoding of the PDSCH.

In an aspect, a scrambling sequence initialization (c_init) parameter may also affect decoding and may be used as a differentiation characteristic for PDSCH. The c_init parameter may not be explicitly signaled. The c_init parameter may be determined based on one or more of a physical cell identity (PCI), CS-RNTI, TRP identifier, or SPS identifier. By specifying that c_init is a function of these parameters associated with different SPS configurations, c_init may differentiate a PDSCH for a first SPS configuration from a PDSCH for a second SPS configuration.

In an aspect, a received DCI may be applicable to any received SPS configuration. The UE 104 may determine which SPS configuration to activate or release by differentiating the DCI based on a differentiation characteristic. For example, a differentiation characteristic may be a CORESET ID or search space ID on which the DCI is received. The SPS configuration in the RRC messages 340, 342 may specify the CORESET ID or search space ID where the activation or release DCI will be received. Another differentiation characteristic may be a CS-RNTI used to scramble the DCI. Two or more CS-RNTIs may be defined with each CS-RNTI corresponding to a different SPS configuration. The UE 104 may monitor activation or release of the SPS configuration using each CS-RNTI.

The differentiation characteristic for a DCI may also be one or more of the fields of the DCI. An activation/release DCI may not utilize every field or every bit of a DCI format for regular scheduling, so such fields may be used to indicate a corresponding SPS configuration. For example, a HARQ process ID field may typically include a value of all 0s for validation of an SPS activation. The HARQ process ID field may be used as a differentiation characteristic by providing different values in the HARQ process ID field corresponding to the different SPS configurations. As another example, a PUCCH resource indicator (PRI) field may not be used for SPS activation because the RRC parameter n1PUCCH-AN is used to determine the PUCCH resource. Accordingly, the PRI field may be used to indicate the SPS configuration of the DCI for activation. Although the PRI field is used during SPS configuration release, one bit of the PRI field may be used to indicate the SPS configuration. As another example, the downlink assignment index (DAI) field may not be used for SPS activation. Accordingly, the DAI field may be used to indicate the SPS configuration of the DCI for activation. The DAI field is not used for release with semi-static HARQ-Ack codebook and may be used to indicate the SPS configuration. For dynamic HARQ-Ack, the DAI field may be used for codebook determination, but one bit may also be used to indicate the SPS configuration. The TCI field may be used to indicate a QCL, which may correspond to a TRP (if the QCL belongs to a QCL group associated with the TRP). Accordingly, the TCI field may be used as a differentiation characteristic indicating the SPS configuration associated with the corresponding TRP.

The UE 104 may transmit the PUCCH 370 and/or the PUCCH 372 to acknowledge one or more SPS PDSCH 360, 362. In an aspect, if separate HARQ-Ack codebooks are used, the UE 104 may transmit both PUCCH 370 and PUCCH 372, each carrying acknowledgements for the corresponding SPS PDSCH 360, 362. If a joint HARQ-Ack codebook is used, the UE may transmit a single PUCCH 370 including acknowledgments for both SPS PDSCH 360 and SPS PDSCH 362, in which case, PUCCH 372 may not be transmitted. However, UE 104 should still know where the ACK/NACK should be placed in the codebook, and therefore, the UE 104 may differentiate the PDSCH in this case.

Figure 4:
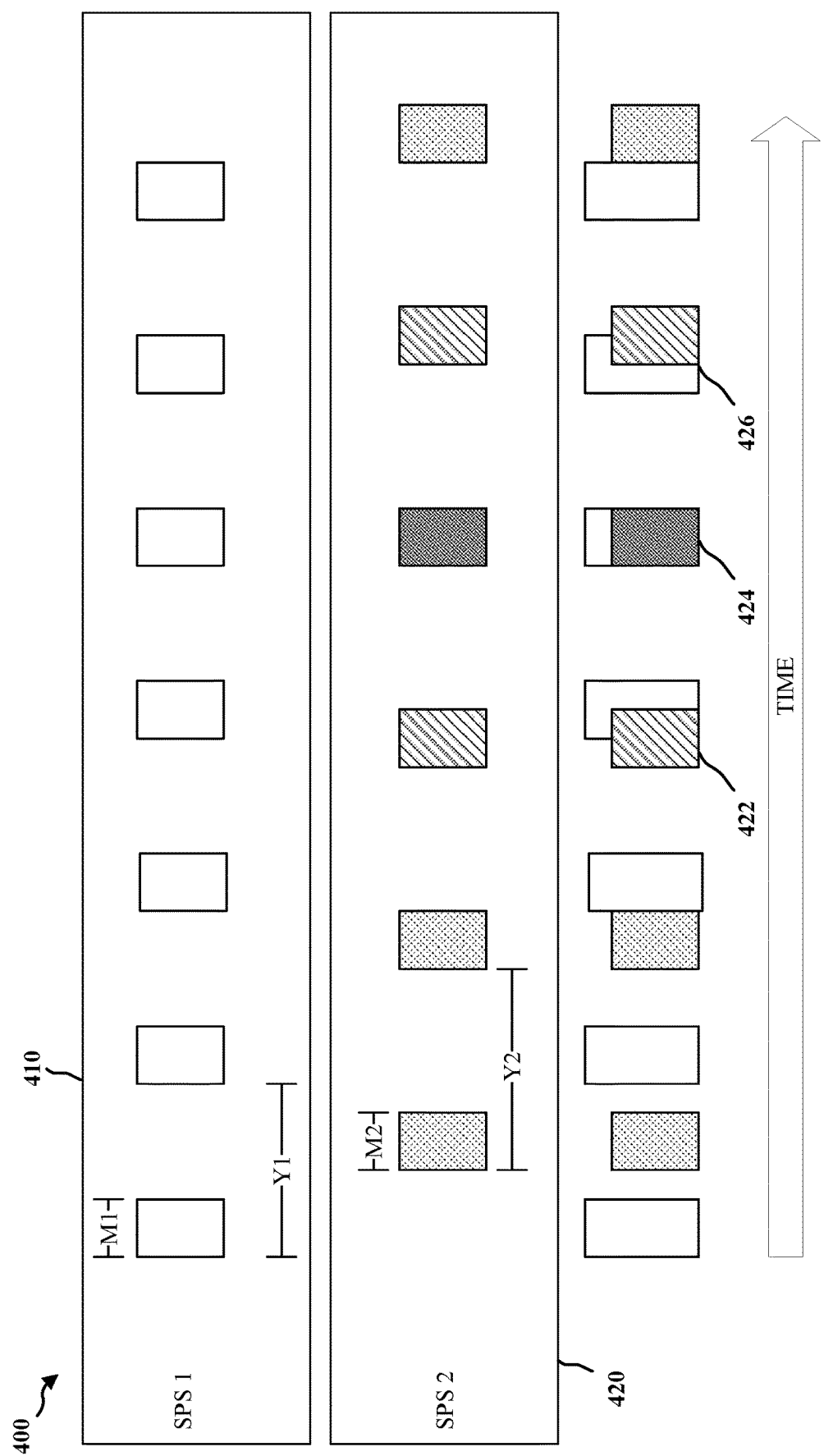
FIG. 4 is a diagram illustrating an example of multiple configurations of semi-persistent scheduling for a UE.

FIG. 4 is a diagram illustrating an example of multiple configurations of SPS for a UE. A first SPS configuration 410 (SPS 1) may have a period Y1 and be activated with a length M1 according to the time-domain resource allocation. A second SPS configuration 420 may have a period Y2 and be activated with a length M2 according to the time-domain resource allocation. Although the first SPS configuration 410 and the second SPS configuration 420 have different time-domain parameters, the first SPS configuration 410 and the second SPS configuration 420 may occasionally overlap. For example, a PDSCH transmission 422 of SPS configuration 420 may partially overlap a PDSCH transmission of SPS configuration 410. As another example, a PDSCH transmission 424 of SPS configuration 420 may completely overlap a PDSCH transmission of SPS configuration 410.

In an aspect, a UE 104 may use scheduled resources to differentiate a PDSCH of the first SPS configuration 410 from a PDSCH of the second SPS configuration 420. In the case where the scheduled resources partially or completely overlap, a UE 104 may be unable to distinguish the PDSCH transmissions. In order to facilitate the UE distinguishing the PDSCH transmissions, the TRPs may use semi-static TRP coordination with priority. For example, the TRPs may share SPS configurations for a UE. Such coordination may not require an ideal backhaul. One of the TRPs 310, 320 may be determined to have priority. For example, a TRP serving as a primary TRP may have priority. When the SPS configurations overlap, the TRP without priority may determine whether to drop a transmission. For example, if the PDSCH transmission 424 completely overlaps a transmission of the first SPS configuration 410, the second TRP 320 may drop the PDSCH transmission 424. For partially overlapping transmissions (e.g., PDSCH transmissions 422, 426), the second TRP 320 may determine whether to drop the PDSCH transmission based on whether the partially overlapping PDSCH transmission can be distinguished by the UE 104.

The UE 104 may also utilize the priority rule for determining an SPS configuration associated with a received PDSCH. If the UE 104 determines that the scheduled PDSCH transmission 424 would completely overlap with a transmission of the SPS configuration 410, the UE 104 may decode only the PDSCH transmission of the SPS configuration 410. The UE 104 may transmit an ACK/NACK for the SPS configuration 410 based on the decoding result and automatically transmit a NACK for the PDSCH transmission 424. Similarly, if the UE 104 is unable to distinguish partially overlapping PDSCH transmissions, the UE may decode only the PDSCH for the first SPS configuration 410 having priority.

Figure 5:
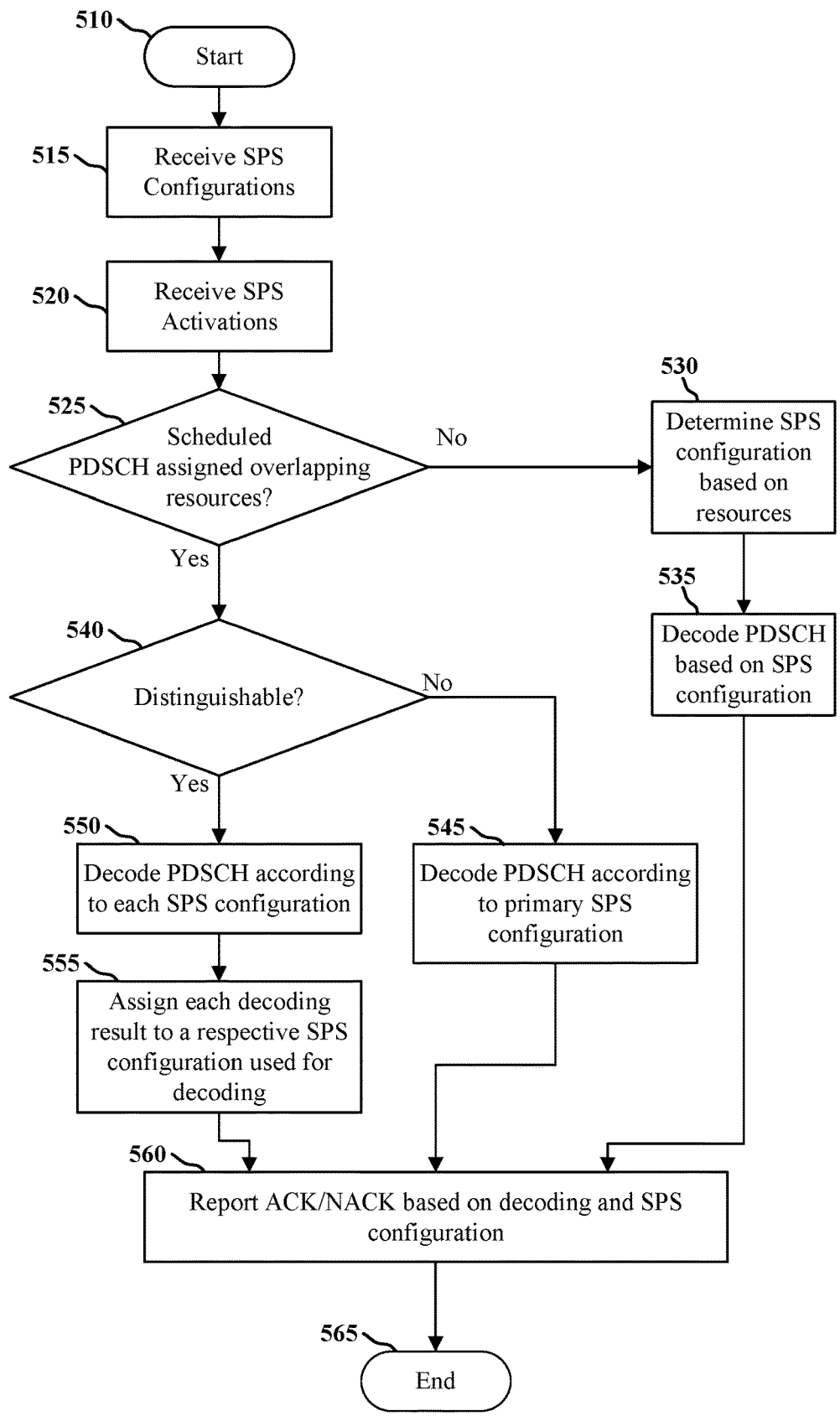
FIG. 5 is a flowchart showing an example method of using multiple SPS configurations.

FIG. 5 is a flow diagram showing an example method 500 for a UE 104 to distinguish SPS configurations of a received PDSCH. The method 500 may begin at 510 and proceed to block 515, where the UE 104 may receive SPS configurations. For example, the UE 104 may execute configuration component 142 to receive RRC messages 340, 342 including at least two SPS configurations. In block 520, the method 500 may include receiving SPS activations. For example, the UE 104 may execute the SPS activation component 144 to receive the PDCCH 350, 352, each including a DCI indicating an SPS activation. Accordingly, the UE 104 may have at least two active SPS configurations that schedule PDSCH transmissions.

At block 525, the UE 104 may determine whether a scheduled PDSCH is assigned overlapping resources. For example, the UE 104 may execute the PDSCH receiving component 146 to determine whether a PDSCH scheduled by a first SPS configuration 410 overlaps with any PDSCH scheduled by the second SPS configuration 420. If there is no overlap, the method 500 may proceed to block 530. If any of the resources overlap, the method 500 may proceed to block 540.

In block 530, the UE 104 may determine an SPS configuration of the PDSCH based on the resources of the scheduled PDSCH. For example, the UE 104 may execute the PDSCH receiving component 146 to determine the SPS configuration of the PDSCH. In block 535, the UE 104 may decode the received PDSCH based on the SPS configuration. For example, the UE 104 may execute the PDSCH receiving component 146 to utilize the SPS configuration parameters to decode the PDSCH received on the resources.

In block 540, the UE 104 may determine whether the scheduled overlapping PDSCHs are distinguishable. In an aspect, two PDSCHs may be distinguishable if any decoding parameters are different. For example, the UE 104 may execute the differentiation component 145 to compare the decoding parameters of the scheduled PDSCH (e.g., MCS, antenna ports, DMRS sequence initialization, TCI state, and scrambling sequence initialization) to determine whether the scheduled PDSCHs are distinguishable. If the PDSCHs are not distinguishable, the method 500 may proceed to block 545. If the PDSCHs are distinguishable, the method 500 may proceed to block 550.

In block 545, the UE 104 may decode the received PDSCH according to a primary SPS configuration. For example, the UE 104 may execute the PDSCH receiving component 146 to decode the received PDSCH according to the primary SPS configuration. The primary SPS configuration may be associated with a primary TRP (e.g., TRP 310). The UE 104 may assume that the second TRP 320 detected the conflict and dropped the PDSCH corresponding to the second PDSCH 362.

In block 550, the UE 104 may decode the received PDSCH according to each SPS configuration that overlaps the resources. For example, the UE 104 may execute the PDSCH receiving component 146 to decode the received PDSCH according to each SPS configuration that overlaps the resources. In block 555, the UE 104 may assign each decoding result to an SPS configuration used for the decoding. For example, the UE 104 may execute the PDSCH receiving component 146 to assign each decoding result to the SPS configuration used for the decoding.

In block 560, the UE 104 may report an ACK or NACK based on the decoding operation and the SPS configuration. For example, the UE 104 may execute the HARQ component 148 to determine the result of the decoding operation as an ACK if the decoding was successful or NACK if the decoding is unsuccessful. The UE 104 may report the determined ACK or NACK based on a HARQ-Ack codebook selected based on the SPS configuration. The location of the ACK or NACK within the codebook may also be based on the SPS configuration.

Figure 6:
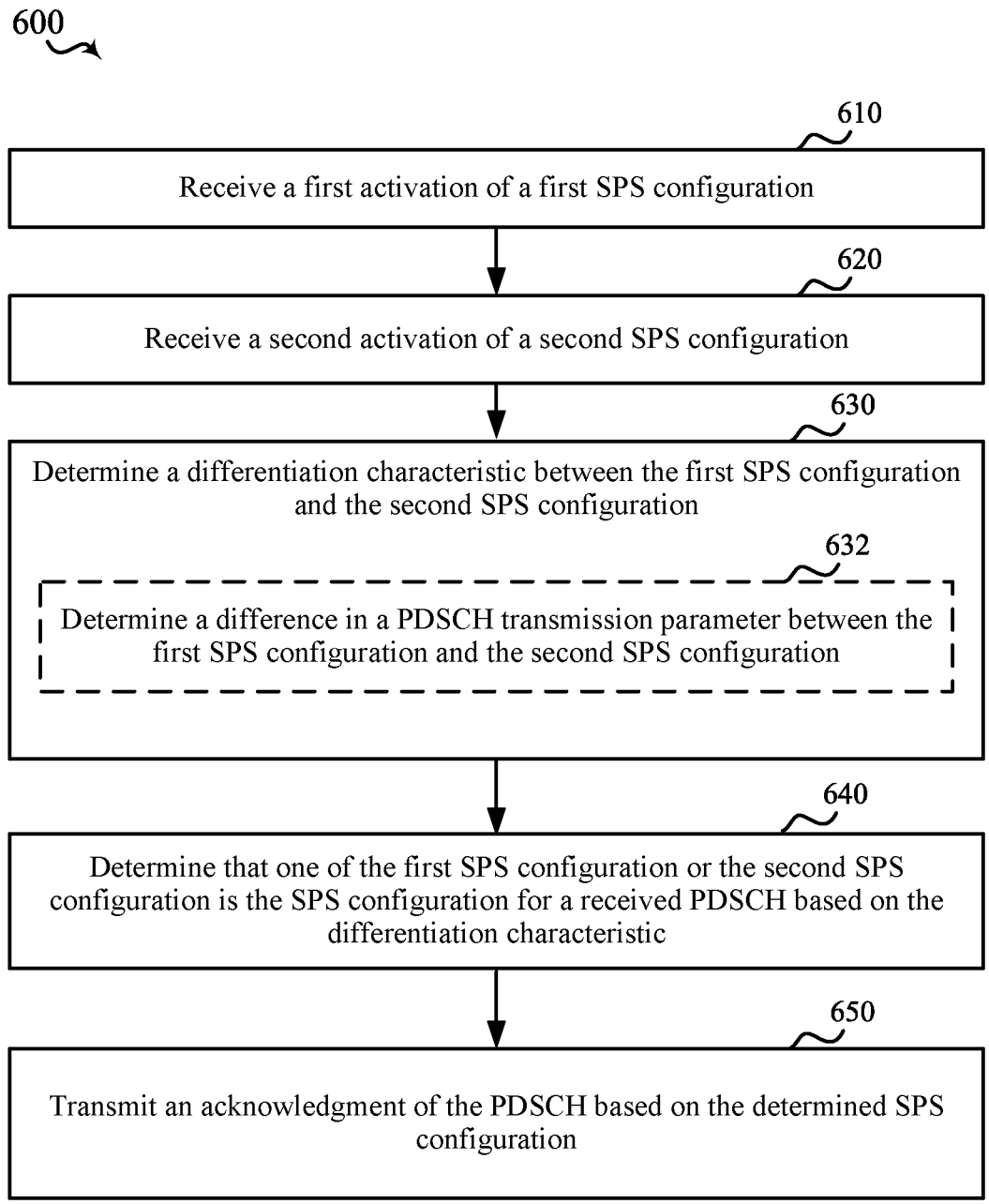
FIG. 6 is a flowchart showing an example method of receiving a PDSCH according to one of multiple SPS configurations.

FIG. 6 is a flowchart showing an example method 600 of receiving a PDSCH according to one of multiple SPS configurations. The method 600 may be performed by the UE 104 including the multi-SPS component 140 and subcomponents thereof. The method 600 may include communications with one or more base stations 102 such as, for example, TRP 310 and TRP 320.

In block 610, the method 600 may include receiving a first activation of a first SPS configuration. In an aspect, for example, the UE 104 and/or the processor 1012 may execute the multi-SPS component 140 and/or the SPS activation component 144 to receive the first activation of the first SPS configuration 410. The first activation may be a DCI indicating the first SPS configuration 410. The DCI may be received on the PDCCH 350 scrambled with a CS-RNTI. Accordingly, the UE 104 and/or the processor 1012 executing the multi-SPS component 140 and/or the SPS activation component 144 may provide means for receiving a first activation of a first SPS configuration.

In block 620, the method 600 may include receiving a second activation of a second SPS configuration. In an aspect, for example, the UE 104 and/or the processor 1012 may execute the multi-SPS component 140 and/or the SPS activation component 144 to receive the second activation of the second SPS configuration 420. Accordingly, the UE 104 and/or the processor 1012 executing the multi-SPS component 140 and/or the SPS activation component 144 may provide means for receiving a second activation of a second SPS configuration.

In block 630, the method 600 may include determining a differentiation characteristic between the first SPS configuration and the second SPS configuration. In an aspect, for example, the UE 104 and/or the processor 1012 may execute the multi-SPS component 140 and/or the differentiation component 145 to determine the differentiation characteristic between the first SPS configuration and the second SPS configuration. For example, the differentiation component 145 may compare parameters of the first SPS configuration and the second SPS configuration to determine whether the SPS configurations are distinguishable based on PDSCH transmission parameters. In optional sub-block 632, for example, the block 630 may include determining a difference in a PDSCH transmission parameter between the first SPS configuration and the second SPS configuration. In an aspect, the differentiation component 145 may determine a difference in a PDSCH transmission parameter between the first SPS configuration and the second SPS configuration. For example, the difference in the PDSCH transmission parameter may be a difference in frequency domain resources or time domain resources of the PDSCH. As another example, the difference in PDSCH transmission parameter may be a difference in one or more of a MCS, DMRS port, a scrambling identifier for DMRS sequence generation, TCI) state, or QCL type. In another aspect, the difference in PDSCH transmission parameter may be a difference in a scrambling sequence initialization used for the codewords of the corresponding PDSCHs. Accordingly, the UE 104 and/or the processor 1012 executing the multi-SPS component 140 and/or the differentiation component 145 may provide means for determining a differentiation characteristic between the first SPS configuration and the second SPS configuration.

In block 640, the method 600 may include determining that one of the first SPS configuration or the second SPS configuration is the SPS configuration for a received PDSCH based on the differentiation characteristic. In an aspect, for example, the UE 104 and/or the processor 1012 may execute the multi-SPS component 140 and/or the PDSCH receiving component 146 to determine that one of the first SPS configuration or the second SPS configuration is the SPS configuration for a received PDSCH based on the differentiation characteristic. Further details of determining the SPS configuration for a received PDSCH based on the differentiation characteristic are discussed below with respect to FIGS. 7 and 8. Accordingly, the UE 104 and/or the processor 1012 executing the multi-SPS component 140 and/or PDSCH receiving component 146 may provide means for determining a differentiation characteristic between the first SPS configuration and the second SPS configuration.

In block 650, the method 600 may include transmitting an acknowledgment of the PDSCH based on the determined SPS configuration. In an aspect, for example, the UE 104 and/or the processor 1012 may execute the multi-SPS component 140 and/or the HARQ component 148 to transmit an acknowledgment of the PDSCH based on the determined SPS configuration. For example, the SPS configuration may indicate the codebook to be used for the acknowledgment. The SPS configuration may also include the number of HARQ processes and the HARQ resource. The acknowledgement may be a positive acknowledgment (ACK) or a negative acknowledgment (NACK). Accordingly, the UE 104 and/or the processor 1012 executing the multi-SPS component 140 and/or the HARQ component 148 may provide means for transmitting an acknowledgment of the PDSCH based on the determined SPS configuration.

Figure 7:
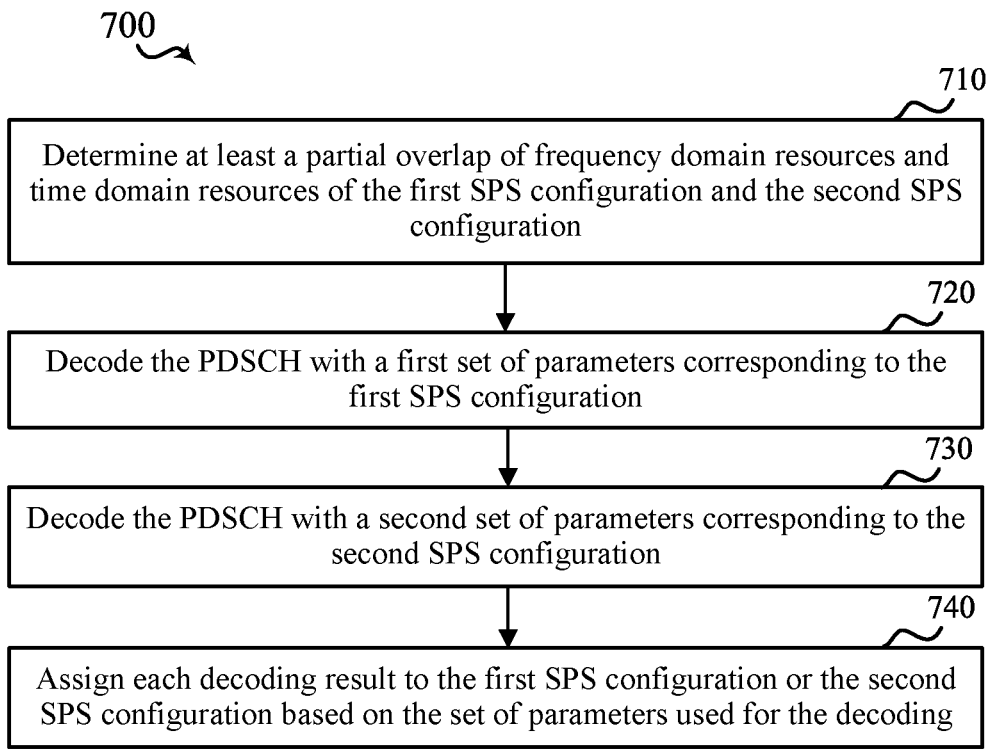
FIG. 7 is a flowchart showing an example method of determining a differentiation characteristic between the first SPS configuration and the second SPS configuration.

FIG. 7 is a flowchart showing an example method 700 of determining a differentiation characteristic between the first SPS configuration and the second SPS configuration. The method 700 may be performed by the UE 104 including the multi-SPS component 140 and subcomponents thereof. The method 700 may include communications with one or more base stations 102 such as, for example, TRP 310 and TRP 320. The method 700 may correspond to block 630 of the method 600.

In block 710, the method 700 may include determining at least a partial overlap of frequency domain resources or time domain resources of the first SPS configuration and the second SPS configuration. In an aspect, for example, the UE 104 and/or the processor 1012 may execute the multi-SPS component 140 and/or the differentiation component 145 to determine at least a partial overlap of frequency domain resources and time domain resources of the first SPS configuration and the second SPS configuration.

In block 720, the method 700 may include decoding the PDSCH with a first set of parameters corresponding to the first SPS configuration. In an aspect, for example, the UE 104 and/or the processor 1012 may execute the multi-SPS component 140 and/or the PDSCH receiving component 146 to decode the PDSCH with a first set of parameters corresponding to the first SPS configuration 410.

In block 730, the method 700 may include decoding the PDSCH with a second set of parameters corresponding to the second SPS configuration. In an aspect, for example, the UE 104 and/or the processor 1012 may execute the multi-SPS component 140 and/or the PDSCH receiving component 146 to decode the PDSCH with the second set of parameters corresponding to the second SPS configuration 420.

In block 740, the method 700 may include assigning each decoding result to the first SPS configuration or the second SPS configuration based on the set of parameters used for the decoding. In an aspect, for example, UE 104 and/or the processor 1012 may execute the multi-SPS component 140 and/or the PDSCH receiving component 146 to assign each decoding result to the first SPS configuration or the second SPS configuration based on the set of parameters used for the decoding.

Figure 8:
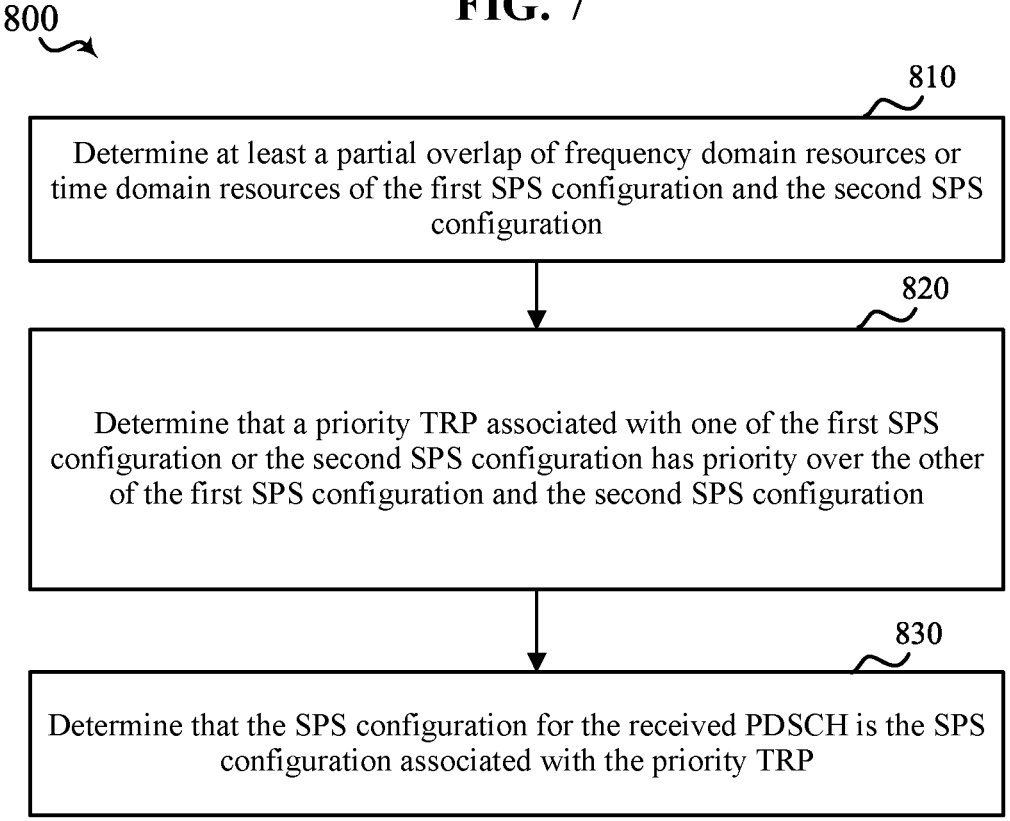
FIG. 8 is a flowchart showing another example method of determining a differentiation characteristic between the first SPS configuration and the second SPS configuration.

FIG. 8 is a flowchart showing an example method 800 of determining a differentiation characteristic between the first SPS configuration and the second SPS configuration. The method 800 may be performed by the UE 104 including the multi-SPS component 140 and subcomponents thereof. The method 800 may include communications with one or more base stations 102 such as, for example, TRP 310 and TRP 320. The method 700 may correspond to block 640 of the method 600.

In block 810, the method 800 may include determining at least a partial overlap of frequency domain resources or time domain resources of the first SPS configuration and the second SPS configuration. In an aspect, for example, UE 104 and/or the processor 1012 may execute the multi-SPS component 140 and/or the differentiation component 145 to determine at least a partial overlap of frequency domain resources or time domain resources of the first SPS configuration and the second SPS configuration.

In block 820, the method 800 may include determining that a priority TRP associated with one of the first SPS configuration or the second SPS configuration has priority over the other of the first SPS configuration and the second SPS configuration. In an aspect, for example, the UE 104 and/or the processor 1012 may execute the multi-SPS component 140 and/or the differentiation component 145 to determine that the priority TRP associated with one of the first SPS configuration or the second SPS configuration has priority over the other of the first SPS configuration and the second SPS configuration.

In block 830, the method 800 may include determining that the SPS configuration for the received PDSCH is the SPS configuration associated with the priority TRP. In an aspect, for example, UE 104 and/or the processor 1012 may execute the multi-SPS component 140 and/or the differentiation component 145 to determine that the SPS configuration for the received PDSCH is the SPS configuration associated with the priority TRP.

Figure 9:
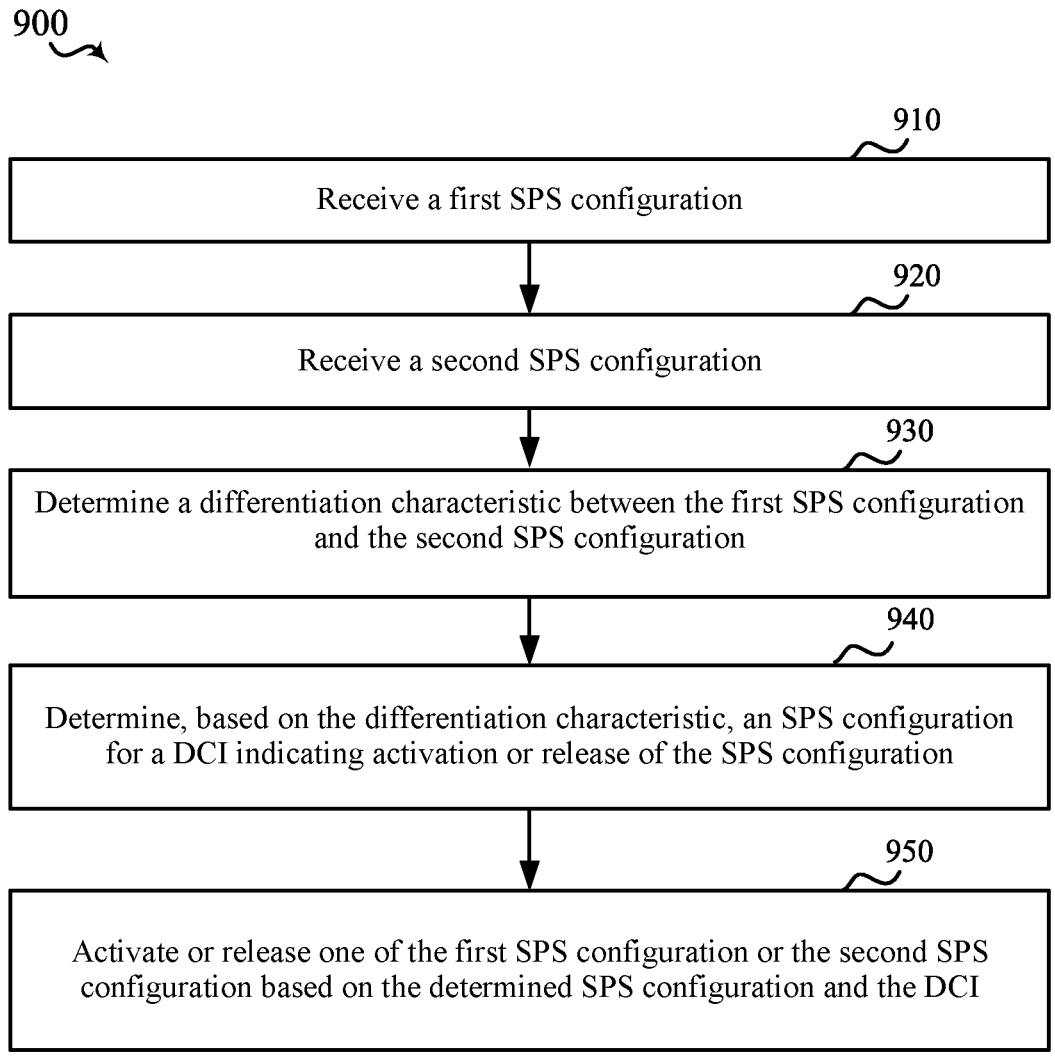
FIG. 9 is a flowchart showing an example method of activating an SPS configuration of multiple SPS configurations.

FIG. 9 is a flowchart showing an example method 900 of activating an SPS configuration of multiple SPS configurations. The method 900 may be performed by the UE 104 including the multi-SPS component 140 and subcomponents thereof. The method 900 may include communications with one or more base stations 102 such as, for example, TRP 310 and/or TRP 320.

In block 910, the method 900 may include receiving a first SPS configuration. In an aspect, for example, UE 104 and/or the processor 1012 may execute the multi-SPS component 140 and/or the configuration component 142 to receive the first SPS configuration 410. For instance, the configuration component 142 may receive the first SPS configuration 410 from the TRP 310 via RRC messages 340. Accordingly, the UE 104 and/or the processor 1012 executing the multi-SPS component 140 and/or configuration component 142 may provide means for receiving a first SPS configuration.

In block 920, the method 900 may include receiving a second SPS configuration. In an aspect, for example, the UE 104 and/or the processor 1012 may execute the multi-SPS component 140 and/or the configuration component 142 to receive the second SPS configuration 420. For instance, the configuration component 142 may receive the second SPS configuration 420 from the TRP 310 and/or the TRP 320 via RRC messages 340 and/or RRC messages 342. Accordingly, the UE 104 and/or the processor 1012 executing the multi-SPS component 140 and/or configuration component 142 may provide means for receiving a second SPS configuration.

In block 930, the method 900 may include determining a differentiation characteristic between the first SPS configuration and the second SPS configuration. In an aspect, for example, UE 104 and/or the processor 1012 may execute the multi-SPS component 140 and/or the differentiation component 145 to determine a differentiation characteristic between the first SPS configuration and the second SPS configuration. Accordingly, the UE 104 and/or the processor 1012 executing the multi-SPS component 140 and/or differentiation component 145 may provide means for determining a differentiation characteristic between the first SPS configuration and the second SPS configuration.

In block 940, the method 900 may include determining, based on the differentiation characteristic, an SPS configuration for a DCI indicating activation or release of the SPS configuration. In an aspect, for example, UE 104 and/or the processor 1012 may execute the multi-SPS component 140 and/or the SPS activation component 144 to determine, based on the differentiation characteristic, the SPS configuration for the DCI on PDCCH 350, 352 indicating activation or release of the SPS configuration. The SPS configuration may be one of the first SPS configuration or the second SPS configuration. Accordingly, the UE 104 and/or the processor 1012 executing the multi-SPS component 140 and/or SPS activation component 144 may provide means for determining, based on the differentiation characteristic, an SPS configuration for a DCI indicating activation or release of the SPS configuration.

In block 950, the method 900 may include activating or releasing one of the first SPS configuration or the second SPS configuration based on the determined SPS configuration and the DCI. In an aspect, for example, UE 104 and/or the processor 1012 may execute the multi-SPS component 140 and/or the SPS activation component 144 to activate or release one of the first SPS configuration or the second SPS configuration based on the determined SPS configuration and the DCI. Accordingly, the UE 104 and/or the processor 1012 executing the multi-SPS component 140 and/or SPS activation component 144 may provide means for activating or releasing one of the first SPS configuration or the second SPS configuration based on the determined SPS configuration and the DCI.

Figure 10:
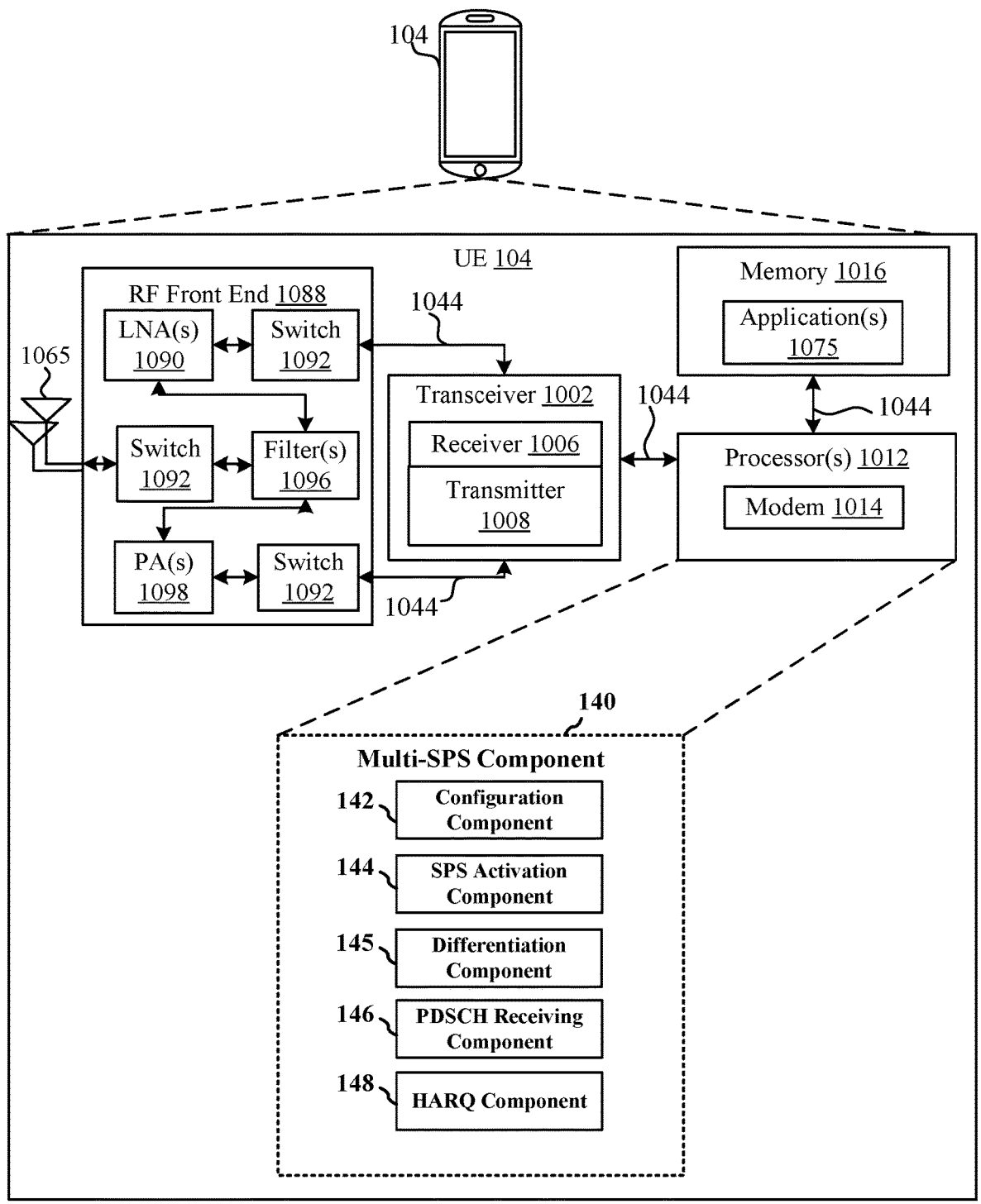
FIG. 10 is a schematic diagram of example components of the UE of FIG. 1.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 1014, and multi-SPS component 140 to enable one or more of the functions described herein related to activation of multiple SPS configurations and receiving PDSCH according to one the multiple SPS configurations. Further, the one or more processors 1012, modem 1014, memory 1016, transceiver 1002, RF front end 1088 and one or more antennas 1065 may be configured to support voice and/or data calls (simultaneously or non-simultaneously) in one or more radio access technologies.

In an aspect, the one or more processors 1012 may include a modem 1014 that uses one or more modem processors. The various functions related to multi-SPS component 140 may be included in modem 1014 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with multi-SPS component 140 may be performed by transceiver 1002.

Also, memory 1016 may be configured to store data used herein and/or local versions of applications 1075, multi-SPS component 140 and/or one or more of subcomponents thereof being executed by at least one processor 1012. Memory 1016 may include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining multi-SPS component 140 and/or one or more of subcomponents thereof, and/or data associated therewith, when UE 104 is operating at least one processor 1012 to execute multi-SPS component 140 and/or one or more subcomponents thereof.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, LNA 1090 may amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 may be used by RF front end 1088 to filter a received signal to obtain an input RF signal. Similarly, in an aspect, for example, a respective filter 1096 may be used to filter an output from a respective PA 1098 to produce an output signal for transmission. In an aspect, each filter 1096 may be connected to a specific LNA 1090 and/or PA 1098. In an aspect, RF front end 1088 may use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 1014 may configure transceiver 1002 to operate at a specified frequency and power level based on the UE configuration of the UE 104 and the communication protocol used by modem 1014.

In an aspect, modem 1014 may be a multiband-multimode modem, which can process digital data and communicate with transceiver 1002 such that the digital data is sent and received using transceiver 1002. In an aspect, modem 1014 may be multiband and be configured to support multiple frequency bands for a specific communications protocol. In an aspect, modem 1014 may be multimode and be configured to support multiple operating networks and communications protocols. In an aspect, modem 1014 may control one or more components of UE 104 (e.g., RF front end 1088, transceiver 1002) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Some Further Example Implementations

A first example method of wireless communication for a user equipment (UE), comprising: receiving a first activation of a first semi-persistent scheduling (SPS) configuration; receiving a second activation of a second SPS configuration; determining a differentiation characteristic between the first SPS configuration and the second SPS configuration; determining that one of the first SPS configuration or the second SPS configuration is the SPS configuration for a received physical downlink shared channel (PDSCH) based on the differentiation characteristic; and transmitting an acknowledgment of the PDSCH based on the determined SPS configuration.

The above first example method, wherein determining the differentiation characteristic comprises determining a difference in a PDSCH transmission parameter between the first SPS configuration and the second SPS configuration.

Any of the above first example methods, wherein the difference in the PDSCH transmission parameter is a difference in frequency domain resources or time domain resources of the PDSCH.

Any of the above first example methods, wherein determining the SPS configuration for the received PDSCH based on the differentiation characteristic comprises: determining at least a partial overlap of frequency domain resources or time domain resources of the first SPS configuration and the second SPS configuration; decoding the PDSCH with a first set of parameters corresponding to the first SPS configuration; decoding the PDSCH with a second set of parameters corresponding to the second SPS configuration; and assigning each decoding result to the first SPS configuration or the second SPS configuration based on the set of parameters used for the decoding.

Any of the above first example methods, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, quasi co location (QCL), or a combination thereof.

Any of the above first example methods, wherein the difference in the PDSCH parameter is a scrambling sequence initialization (c_init) associated with a codeword of each of the first SPS configuration and the second SPS configuration.

Any of the above first example methods, wherein determining the SPS configuration for the received PDSCH based on the differentiation characteristic comprises: determining at least a partial overlap of frequency domain resources or time domain resources of the first SPS configuration and the second SPS configuration; determining that a priority transmit receive point (TRP) associated with one of the first SPS configuration or the second SPS configuration has priority over the other of the first SPS configuration and the second SPS configuration; and determining that the SPS configuration for the received PDSCH is the SPS configuration associated with the priority TRP.

A first example apparatus for wireless communication, comprising: a memory; and at least one processor coupled to the memory and configured to: receive a first activation of a first semi-persistent scheduling (SPS) configuration; receive a second activation of a second SPS configuration; determine a differentiation characteristic between the first SPS configuration and the second SPS configuration; determine that one of the first SPS configuration or the second SPS configuration is the SPS configuration for a received physical downlink shared channel (PDSCH) based on the differentiation characteristic; and transmit an acknowledgment of the PDSCH based on the determined SPS configuration.

The above first example apparatus, wherein the processor is configured to determine a difference in a PDSCH transmission parameter between the first SPS configuration and the second SPS configuration.

Any of the above first example apparatuses, wherein the difference in the PDSCH transmission parameter is a difference in frequency domain resources or time domain resources of the PDSCH.

Any of the above first example apparatuses, wherein the processor is configured to: determine at least a partial overlap of frequency domain resources or time domain resources of the first SPS configuration and the second SPS configuration; decode the PDSCH with a first set of parameters corresponding to the first SPS configuration; decode the PDSCH with a second set of parameters corresponding to the second SPS configuration; and assign each decoding result to the first SPS configuration or the second SPS configuration based on the set of parameters used for the decoding.

Any of the above first example apparatuses, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or combination thereof.

Any of the above first example apparatuses, wherein the difference in the PDSCH parameter is a scrambling sequence initialization (c_init) associated with a codeword of each of the first SPS configuration and the second SPS configuration.

Any of the above first example apparatuses, wherein the processor is configured to: determine at least a partial overlap of frequency domain resources or time domain resources of the first SPS configuration and the second SPS configuration; and determine that a priority transmit receive point (TRP) associated with one of the first SPS configuration or the second SPS configuration has priority over the other of the first SPS configuration and the second SPS configuration; and determine that the SPS configuration for the received PDSCH is the SPS configuration associated with the priority TRP.

A second example apparatus for wireless communication, comprising: means for receiving a first activation of a first semi-persistent scheduling (SPS) configuration and for receiving a second activation of a second SPS configuration; means for determining a differentiation characteristic between the first SPS configuration and the second SPS configuration; means for determining that one of the first SPS configuration or the second SPS configuration is the SPS configuration for a received physical downlink shared channel (PDSCH) based on the differentiation characteristic; and means for transmitting an acknowledgment of the PDSCH based on the determined SPS configuration.

The above second example apparatus, wherein the means for determining the differentiation characteristic is configured to determine a difference in a PDSCH transmission parameter between the first SPS configuration and the second SPS configuration.

Any of the above second example apparatuses, wherein the difference in the PDSCH transmission parameter is a difference in frequency domain resources or time domain resources of the PDSCH.

Any of the above second example apparatuses, wherein the means for determining the SPS configuration for the received PDSCH based on the differentiation characteristic is configured to: determine at least a partial overlap of frequency domain resources or time domain resources of the first SPS configuration and the second SPS configuration; decode the PDSCH with a first set of parameters corresponding to the first SPS configuration; decode the PDSCH with a second set of parameters corresponding to the second SPS configuration; and assign each decoding result to the first SPS configuration or the second SPS configuration based on the set of parameters used for the decoding.

Any of the above second example apparatuses, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or a combination thereof.

Any of the above second example apparatuses, wherein the difference in the PDSCH parameter is a scrambling sequence initialization (c_init) associated with a codeword of each of the first SPS configuration and the second SPS configuration.

Any of the above second example apparatuses, wherein the means for determining the SPS configuration for the received PDSCH based on the differentiation characteristic is configured to: determine at least a partial overlap of frequency domain resources or time domain resources of the first SPS configuration and the second SPS configuration; determine that a priority transmit receive point (TRP) associated with one of the first SPS configuration or the second SPS configuration has priority over the other of the first SPS configuration and the second SPS configuration; and determine that the SPS configuration for the received PDSCH is the SPS configuration associated with the priority TRP.

A first example non-transitory computer-readable medium storing computer executable code, comprising code to: receive a first activation of a first semi-persistent scheduling (SPS) configuration; receive a second activation of a second SPS configuration; determine a differentiation characteristic between the first SPS configuration and the second SPS configuration; determine that one of the first SPS configuration or the second SPS configuration is the SPS configuration for a received physical downlink shared channel (PDSCH) based on the differentiation characteristic; and transmit an acknowledgment of the PDSCH based on the determined SPS configuration.

The above first example non-transitory computer-readable medium comprising code to determine a difference in a PDSCH transmission parameter between the first SPS configuration and the second SPS configuration.

Any of the above first example non-transitory computer-readable mediums, wherein the difference in the PDSCH transmission parameter is a difference in frequency domain resources or time domain resources of the PDSCH.

Any of the above first example non-transitory computer-readable mediums, comprising code to: determine at least a partial overlap of frequency domain resources or time domain resources of the first SPS configuration and the second SPS configuration; decode the PDSCH with a first set of parameters corresponding to the first SPS configuration; decode the PDSCH with a second set of parameters corresponding to the second SPS configuration; and assign each decoding result to the first SPS configuration or the second SPS configuration based on the set of parameters used for the decoding.

Any of the above first example non-transitory computer-readable mediums, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or a combination thereof.

Any of the above first example non-transitory computer-readable mediums, wherein the difference in the PDSCH parameter is a scrambling sequence initialization (c_init) associated with a codeword of each of the first SPS configuration and the second SPS configuration.

Any of the above first example non-transitory computer-readable mediums, comprising code to: determine at least a partial overlap of frequency domain resources or time domain resources of the first SPS configuration and the second SPS configuration; determine that a priority transmit receive point (TRP) associated with one of the first SPS configuration or the second SPS configuration has priority over the other of the first SPS configuration and the second SPS configuration; and determine that the SPS configuration for the received PDSCH is the SPS configuration associated with the priority TRP.

A second example method of wireless communication for a user equipment (UE), comprising: receiving a first semi-persistent scheduling (SPS) configuration; receiving a second SPS configuration; determining a differentiation characteristic between the first SPS configuration and the second SPS configuration; determining, based on the differentiation characteristic, an SPS configuration for a downlink control information (DCI) indicating activation or release of the SPS configuration; and activating or releasing one of the first SPS configuration or the second SPS configuration based on the determined SPS configuration and the DCI.

The above second example method, wherein the differentiation characteristic is a CORESET ID or search space ID where the DCI is received.

Any of the above second example methods, wherein the differentiation characteristic is a configured scheduling radio network temporary identifier (CS-RNTI) used to scramble a CRC of the DCI.

Any of the above second example methods, wherein the differentiation characteristic is a hybrid automatic repeat request (HARQ) process ID indicated in the DCI.

Any of the above second example methods, wherein the differentiation characteristic is a physical uplink control channel (PUCCH) resource indicator (PRI) indicated in the DCI or bit thereof.

Any of the above second example methods, wherein the differentiation characteristic is a downlink assignment index (DAI) indicated in the DCI or bit thereof.

Any of the above second example methods, wherein the differentiation characteristic is a transmission configuration indicator (TCI) state corresponding to a quasi co-location (QCL) group.

A third example apparatus for wireless communication, comprising: a memory; and
at least one processor coupled to the memory and configured to: receive a first semi-persistent scheduling (SPS) configuration; receive a second SPS configuration; determine a differentiation characteristic between the first SPS configuration and the second SPS configuration; determine, based on the differentiation characteristic, an SPS configuration for a downlink control information (DCI) indicating activation or release of the SPS configuration; and activate or release one of the first SPS configuration or the second SPS configuration based on the determined SPS configuration and the DCI.

The above third example apparatus, wherein the differentiation characteristic is a CORESET ID or search space ID where the DCI is received.

Any of the above third example apparatuses, wherein the differentiation characteristic is a configured scheduling radio network temporary identifier (CS-RNTI) used to scramble a CRC of the DCI.

Any of the above third example apparatuses, wherein the differentiation characteristic is a hybrid automatic repeat request (HARQ) process ID indicated in the DCI.

Any of the above third example apparatuses, wherein the differentiation characteristic is a physical uplink control channel (PUCCH) resource indicator (PRI) indicated in the DCI or bit thereof.

Any of the above third example apparatuses, wherein the differentiation characteristic is a downlink assignment index (DAI) indicated in the DCI or bit thereof.

Any of the above third example apparatuses, wherein the differentiation characteristic is a transmission configuration indicator (TCI) state corresponding to a quasi co-location (QCL) group.

A fourth example apparatuses, comprising: means for receiving a first semi-persistent scheduling (SPS) configuration and a second SPS configuration; means for determining a differentiation characteristic between the first SPS configuration and the second SPS configuration; means for determining, based on the differentiation characteristic, an SPS configuration for a downlink control information (DCI) indicating activation or release of the SPS configuration; and means for activating or releasing one of the first SPS configuration or the second SPS configuration based on the determined SPS configuration and the DCI.

The above fourth example apparatus, wherein the differentiation characteristic is a CORESET ID or search space ID where the DCI is received.

Any of the above fourth example apparatuses, wherein the differentiation characteristic is a configured scheduling radio network temporary identifier (CS-RNTI) used to scramble a CRC of the DCI.

Any of the above fourth example apparatuses, wherein the differentiation characteristic is a hybrid automatic repeat request (HARQ) process ID indicated in the DCI.

Any of the above fourth example apparatuses, wherein the differentiation characteristic is a physical uplink control channel (PUCCH) resource indicator (PRI) indicated in the DCI or bit thereof.

Any of the above fourth example apparatuses, wherein the differentiation characteristic is a downlink assignment index (DAI) indicated in the DCI or bit thereof.

Any of the above fourth example apparatuses, wherein the differentiation characteristic is a transmission configuration indicator (TCI) state corresponding to a quasi co-location (QCL) group.

A second example non-transitory computer-readable medium storing computer executable code, comprising code to: receive a first semi-persistent scheduling (SPS) configuration; receive a second SPS configuration; determine a differentiation characteristic between the first SPS configuration and the second SPS configuration; determine, based on the differentiation characteristic, an SPS configuration for a downlink control information (DCI) indicating activation or release of the SPS configuration; and activate or release one of the first SPS configuration or the second SPS configuration based on the determined SPS configuration and the DCI.

The above second example non-transitory computer-readable medium, wherein the differentiation characteristic is a CORESET ID or search space ID where the DCI is received.

Any of the above second example non-transitory computer-readable mediums, wherein the differentiation characteristic is a configured scheduling radio network temporary identifier (CS-RNTI) used to scramble a CRC of the DCI.

Any of the above second example non-transitory computer-readable mediums, wherein the differentiation characteristic is a hybrid automatic repeat request (HARQ) process ID indicated in the DCI.

Any of the above second example non-transitory computer-readable mediums, wherein the differentiation characteristic is a physical uplink control channel (PUCCH) resource indicator (PRI) indicated in the DCI or bit thereof.

Any of the above second example non-transitory computer-readable mediums, wherein the differentiation characteristic is a downlink assignment index (DAI) indicated in the DCI or bit thereof.

Any of the above second example non-transitory computer-readable mediums, wherein the differentiation characteristic is a transmission configuration indicator (TCI) state corresponding to a quasi co-location (QCL) group.

What is claimed is:

1. A method of wireless communication for a user equipment (UE), comprising:
   receiving a first activation of a first semi-persistent scheduling (SPS) configuration;
   receiving a second activation of a second SPS configuration;
   determining at least a partial overlap of frequency domain resources or time domain resources of the first SPS configuration and the second SPS configuration;
   determining a differentiation characteristic between the first SPS configuration and the second SPS configuration;
   determining that one of the first SPS configuration or the second SPS configuration is the SPS configuration for a received physical downlink shared channel (PDSCH) based on the differentiation characteristic, wherein determining the SPS configuration for the received PDSCH based on the differentiation characteristic comprises:
      decoding the PDSCH with a first set of parameters corresponding to the first SPS configuration;
      decoding the PDSCH with a second set of parameters corresponding to the second SPS configuration; and
      assigning each decoding result to the first SPS configuration or the second SPS configuration based on the set of parameters used for the decoding; and
   transmitting an acknowledgment of the PDSCH based on the determined SPS configuration.

2. The method of claim 1, wherein determining the differentiation characteristic comprises determining a difference in a PDSCH transmission parameter between the first SPS configuration and the second SPS configuration.

3. The method of claim 2, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, quasi co location (QCL), or a combination thereof.

4. The method of claim 2, wherein the difference in the PDSCH transmission parameter is a scrambling sequence initialization (c_init) associated with a codeword of each of the first SPS configuration and the second SPS configuration.

5. The method of claim 1, wherein determining the SPS configuration for the received PDSCH based on the differentiation characteristic comprises:
   determining that a priority transmit receive point (TRP) associated with one of the first SPS configuration or the second SPS configuration has priority over the other of the first SPS configuration and the second SPS configuration; and
   determining that the SPS configuration for the received PDSCH is the SPS configuration associated with the priority TRP.

6. An apparatus for wireless communication, comprising:
   a memory; and
   at least one processor coupled to the memory and configured to:
   receive a first activation of a first semi-persistent scheduling (SPS) configuration;
   receive a second activation of a second SPS configuration;
   determine at least a partial overlap of frequency domain resources or time domain resources of the first SPS configuration and the second SPS configuration;
   decode a received physical downlink shared channel (PDSCH) with a first set of parameters corresponding to the first SPS configuration;
   decode the PDSCH with a second set of parameters corresponding to the second SPS configuration;
   assign each decoding result to the first SPS configuration or the second SPS configuration based on the set of parameters used for the decoding;
   determine a differentiation characteristic between the first SPS configuration and the second SPS configuration;
   determine that one of the first SPS configuration or the second SPS configuration is the SPS configuration for the PDSCH based on the differentiation characteristic; and
   transmit an acknowledgment of the PDSCH based on the determined SPS configuration.

7. The apparatus of claim 6, wherein the processor is configured to determine a difference in a PDSCH transmission parameter between the first SPS configuration and the second SPS configuration.

8. The apparatus of claim 7, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or combination thereof.

9. The apparatus of claim 7, wherein the difference in the PDSCH transmission parameter is a scrambling sequence initialization (c_init) associated with a codeword of each of the first SPS configuration and the second SPS configuration.

10. The apparatus of claim 6, wherein the processor is configured to:
   determine that a priority transmit receive point (TRP) associated with one of the first SPS configuration or the second SPS configuration has priority over the other of the first SPS configuration and the second SPS configuration; and
   determine that the SPS configuration for the received PDSCH is the SPS configuration associated with the priority TRP.

11. An apparatus for wireless communication, comprising:
   means for receiving a first activation of a first semi-persistent scheduling (SPS) configuration;
   means for receiving a second activation of a second SPS configuration;
   means for determining at least a partial overlap of frequency domain resources or time domain resources of the first SPS configuration and the second SPS configuration;
   means for determining a differentiation characteristic between the first SPS configuration and the second SPS configuration;
   means for determining that one of the first SPS configuration or the second SPS configuration is the SPS configuration for a received physical downlink shared channel (PDSCH) based on the differentiation characteristic, wherein the means for determining the SPS configuration for the received PDSCH based on the differentiation characteristic is configured to:
      decode the PDSCH with a first set of parameters corresponding to the first SPS configuration;

decode the PDSCH with a second set of parameters corresponding to the second SPS configuration; and
assign each decoding result to the first SPS configuration or the second SPS configuration based on the set of parameters used for the decoding; and
means for transmitting an acknowledgment of the PDSCH based on the determined SPS configuration.

12. The apparatus of claim 11, wherein the means for determining the differentiation characteristic is configured to determine a difference in a PDSCH transmission parameter between the first SPS configuration and the second SPS configuration.

13. The apparatus of claim 12, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or a combination thereof.

14. The apparatus of claim 12, wherein the difference in the PDSCH parameter is a scrambling sequence initialization (c_init) associated with a codeword of each of the first SPS configuration and the second SPS configuration.

15. The apparatus of claim 11, wherein the means for determining the SPS configuration for the received PDSCH based on the differentiation characteristic is configured to:
determine that a priority transmit receive point (TRP) associated with one of the first SPS configuration or the second SPS configuration has priority over the other of the first SPS configuration and the second SPS configuration; and
determine that the SPS configuration for the received PDSCH is the SPS configuration associated with the priority TRP.

16. A non-transitory computer-readable medium storing computer executable code, comprising code to:
receive a first activation of a first semi-persistent scheduling (SPS) configuration;
receive a second activation of a second SPS configuration;
determine at least a partial overlap of frequency domain resources or time domain resources of the first SPS configuration and the second SPS configuration
determine a differentiation characteristic between the first SPS configuration and the second SPS configuration;
determine that one of the first SPS configuration or the second SPS configuration is the SPS configuration for a received physical downlink shared channel (PDSCH) based on the differentiation characteristic, wherein the code to determine the SPS configuration for the received PDSCH based on the differentiation characteristic, comprises code to:
decode the PDSCH with a first set of parameters corresponding to the first SPS configuration;
decode the PDSCH with a second set of parameters corresponding to the second SPS configuration; and
assign each decoding result to the first SPS configuration or the second SPS configuration based on the set of parameters used for the decoding; and
transmit an acknowledgment of the PDSCH based on the determined SPS configuration.

17. The non-transitory computer-readable medium of claim 16, comprising code to determine a difference in a PDSCH transmission parameter between the first SPS configuration and the second SPS configuration.

18. The non-transitory computer-readable medium of claim 17, wherein the difference in the PDSCH transmission parameter comprises a difference in one or more of: a modulation and coding scheme (MCS), a demodulation reference signal port (DMRS), a scrambling identifier for DMRS sequence generation, transmission configuration indicator (TCI) state, or quasi co location (QCL), or a combination thereof.

19. The non-transitory computer-readable medium of claim 17, wherein the difference in the PDSCH parameter is a scrambling sequence initialization (c_init) associated with a codeword of each of the first SPS configuration and the second SPS configuration.

20. The non-transitory computer-readable medium of claim 16, comprising code to:
determine that a priority transmit receive point (TRP) associated with one of the first SPS configuration or the second SPS configuration has priority over the other of the first SPS configuration and the second SPS configuration; and
determine that the SPS configuration for the received PDSCH is the SPS configuration associated with the priority TRP.

* * * * *